Gano & Miller.
Brick Machine.
N° 80,470.  Patented July 28, 1868.
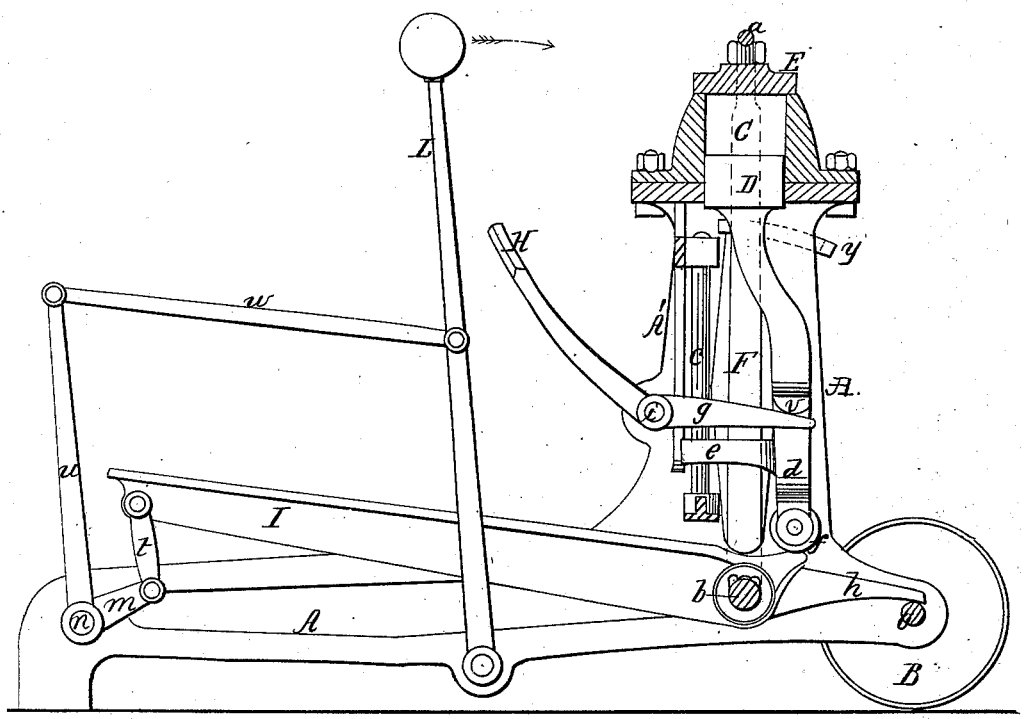
Witnesses,
P. T. Dodge
L. Hailer
Inventors;
R. M. Gano &
R. S. Miller
by Dodge & Munn
their attys

United States Patent Office.

R. M. GANO AND R. S. MILLER, OF PITTSBURG, PENNSYLVANIA.

*Letters Patent No. 80,470, dated July 28, 1868.*

IMPROVED BRICK-MACHINE.

The Schedule referred to in these Letters Patent and making part of the same.

TO ALL WHOM IT MAY CONCERN:

Be it known that we, R. M. GANO and R. S. MILLER, of Pittsburg, in the county of Allegheny, and State of Pennsylvania, have invented certain new and useful Improvements in Brick-Machines; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention consists in a novel and improved method of constructing a machine for re-pressing bricks, as hereinafter explained.

The drawing represents a side elevation of our improved machine, with a portion shown in section.

In the manufacture of what are known as "pressed bricks," for the fronts of fine buildings, the bricks are first moulded, and laid out to dry for two or three days, when they are re-pressed separately in a hand-machine, to render them more perfect in form, and more solid and compact.

It is necessary that the press used for this purpose should be very strong, and at the same time so constructed that the operator should be able to operate it without changing his position, so as to save time.

To produce such a machine is the object of our invention; and to make it, we provide a strong metallic frame, consisting of a horizontal part, A, and an upright part, A', which may be made separately or together, these parts being duplicated, and bolted together by the rods $n$ and $r$, and the axle $o$, there being two wheels, B, secured to the latter, so that the machine can be conveniently moved about, as desired.

Upon the top of the upright part is secured a strong box-shaped casting, having a rectangular opening, C, in its centre, of the length and width of the brick to be pressed.

A follower, D, is fitted into the bottom of the chamber or mould C, and is supported on a strong stem, $d$, which has a friction-roller, $f$, secured in its lower end, resting on the short arm of a strong lever, I, the stem $d$ being held in position by an arm, $e$, which encircles and slides upon a guide-rod, $c$, as represented in the drawing.

The lever I is fulcrumed on a strong cross-rod, $b$, which rests in slots in the upright part A', and is free to rise slightly therein, as hereinafter explained.

The long arm of this lever I is connected by a link, $t$, to an arm, $m$, secured rigidly to the cross-bar $n$, to which is rigidly attached an upright lever, $u$, which latter is connected by a rod, $w$, to another lever, L, by which the machine is to be operated.

A cover, E, is fitted to slide over and cover the top of the mould C, this cover being connected by a strong bar, F, on each side, to the rod $b$, on which the lever I is fulcrumed, the cover swinging to and fro on this fulcrum, far enough to cover and uncover the mould C, there being a block or bar, $y$, secured on each side of the upright, A', with lugs on their ends which serve to limit the movements of the cover E, and keep it from falling over, when swung off from over the mould, there being a handle, $a$, secured to the top of the cover E to move it by.

From the short end of the lever I there project two arms, $h$, which are so arranged that, when the long end is elevated, the extremity of these arms, $h$, wil strike upon the axle $o$, and thus, as the long end of the lever I continues to rise, the fulcrum-rod $b$ will also be raised in the slots in which it rests; and as the bars F are connected to this rod $b$, the cover E will also be slightly raised, and thereby loosened, so that it can be swung from over the mould.

It should be observed that the bars F are of such a length that, when the long end of lever I is pressed down, the cover will be drawn down tight upon the top of the mould, thereby closing it securely.

A lever, H, is connected rigidly to a rod, $i$, from which project two arms, $g$, which engage under shoulders, $v$, on the sides of the stem $d$ of the follower D, by means of which, after the cover is removed, the follower D is elevated, and the brick thereby removed from the mould after it has been pressed.

The operation is as follows: A brick is placed in the mould C, and the cover swung over it. The lever L is then moved in the direction indicated by the arrow, which forces the follower D up into the mould, and thereby powerfully compresses the brick therein. The lever L is then thrown back, which lets the follower drop, at the same time raising and releasing the cover by the arms $h$ striking on the axle $o$, as already explained.

The lever H is then depressed, which raises the follower D, and thereby lifts the brick out of the mould, when it is removed and another put in its place. By this method of construction, we produce a machine that exerts great power, and that can be operated with ease and rapidity.

Having thus described our invention, what we claim, is—

The combination of the follower D $d$, lever I, connected to the rock-shaft $n$ and the levers $u$ and L, connected by the rod $w$ with the lever H and lugs $v$, constructed and arranged to operate substantially as and for the purpose set forth.

R. M. GANO,
R. S. MILLER.

Witnesses:
GEORGE OGDEN,
HENDERSON E. DAVIS.